Sept. 14, 1937.  N. M. MARSILIUS  2,093,050
THREAD MILLING MACHINE
Filed April 2, 1935   4 Sheets-Sheet 2

INVENTOR
Newman M. Marsilius
BY C. M. Newman
ATTORNEY

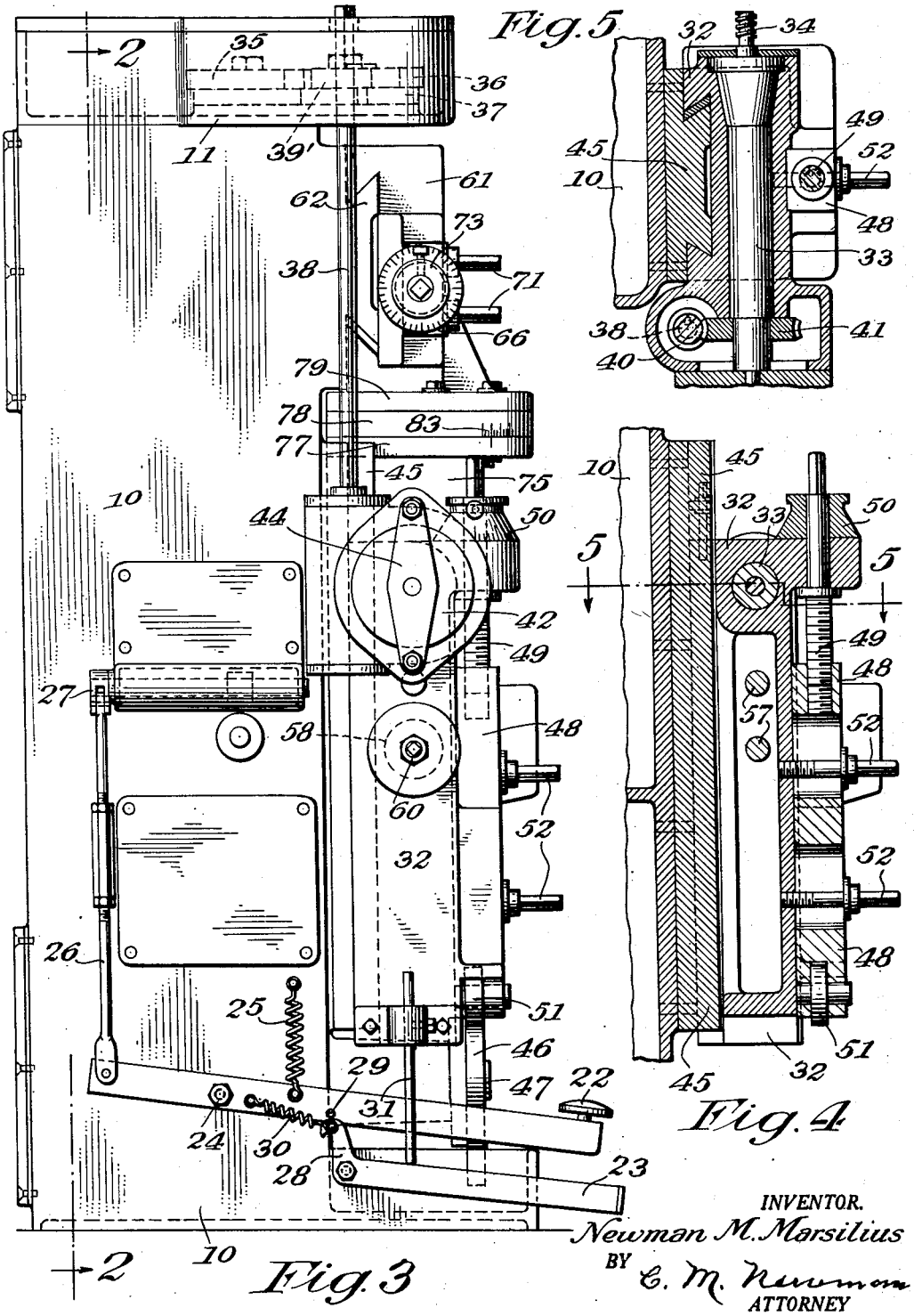

Sept. 14, 1937.  N. M. MARSILIUS  2,093,050
THREAD MILLING MACHINE
Filed April 2, 1935  4 Sheets-Sheet 4
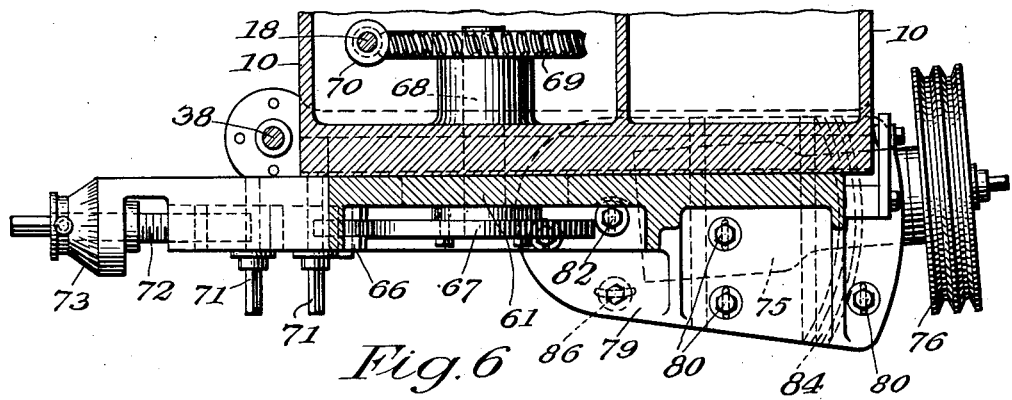
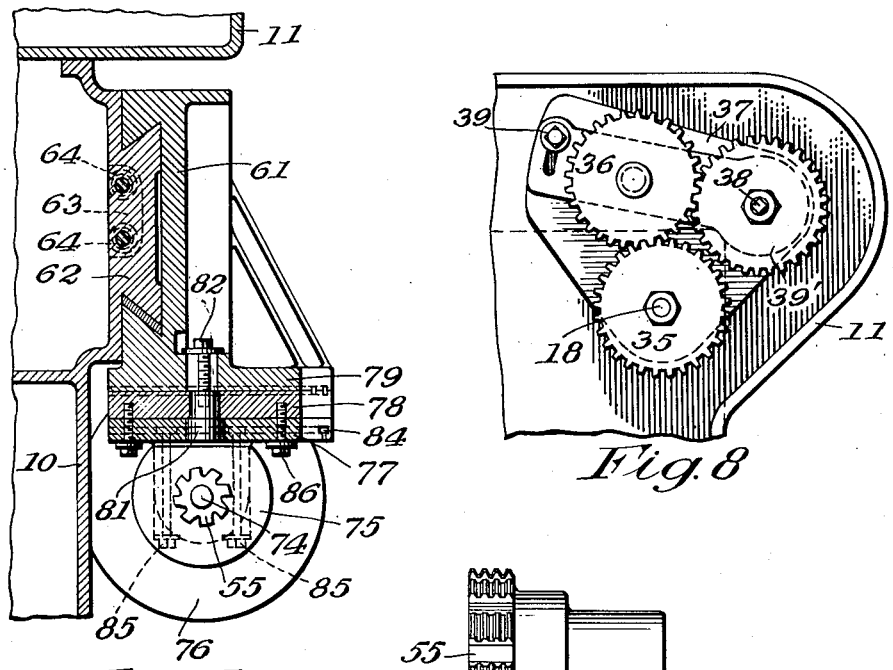
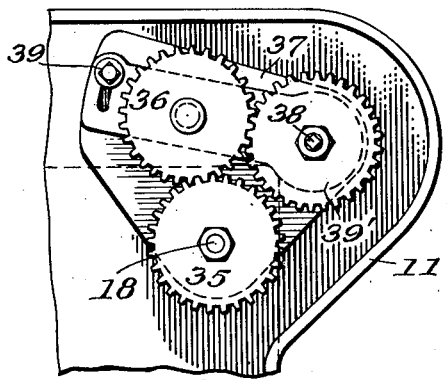
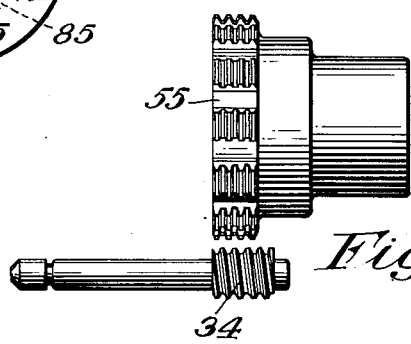
INVENTOR.
Newman M. Marsilius
BY C. M. Newman
ATTORNEY Patented Sept. 14, 1937

2,093,050

UNITED STATES PATENT OFFICE 2,093,050

THREAD MILLING MACHINE

Newman M. Marsilius, Bridgeport, Conn., assignor, by mesne assignments, to The Bridgeport Bronze Company, Bridgeport, Conn., a corporation of Connecticut Application April 2, 1935, Serial No. 14,281

3 Claims. (Cl. 90—4)

My invention relates generally to metal working machines, such for instance as turning thread cutting and cam milling, and more specifically to machines for cutting relatively heavy and special forms of female threads, as used in worms for driving worm gears commonly employed in the smaller types of machines, as for instance speedometers, electric motors and like mechanisms where a dependable reduction of speed may be acquired.

An object of the invention is to provide a semi-automatic machine wherein the services of but a single attendant is required to place the work into and remove it from the machine.

A blank to be threaded is rotatably supported in a bearing carried by a vertically movable slide which is fed forward into position for a cutting operation and slowly rotated during the operation and then returned to normal position when the work is finished.

A second horizontally operated slide is also provided to move the cutter horizontally with respect to the blank to be cut and to carry the cutting unit at a suitable angle with respect to the work piece to insure a proper lead for the worm. The assembly further includes proper means for adjustment to compensate for various sizes and conditions of the work to be performed. Suitable automatic air operated chucking means are provided for holding work in position during the cutting operations.

The machine furthermore includes the provision of means whereby the cutter spindle support may be adjusted relative to its slide and the work piece to be operated upon, so as to change the relative angle of the cutter to the work in order to increase or decrease the lead in the worm or work piece produced.

With these and incidental objects in view, the invention includes certain novel features of construction and combination of parts, the essential elements of which are set forth in the appended claims and a preferred form of embodiment of which is hereinafter described with reference to the drawings which accompany and form part of this specification.

In the drawings forming part of this application, like parts are designated by the same reference characters in each of the views and in which Fig. 1 shows a front elevation of my improved milling machine, having a cover plate removed from its upper side;

Fig. 3 is a side elevation of the machine, as shown from the left in Fig. 1;

Fig. 4 is a vertical sectional view taken on line 4—4 of Fig. 1, better to show the adjustable and rotatable blank supporting mechanism to be operated upon for the production of a worm, as shown in Fig. 9, or other piece of work which my machine is capable of producing;

Fig. 5 shows a horizontal cross section taken on line 5—5 of Figs. 1 and 4, which further illustrates the construction including the adjustable and rotatable blank supporting mechanism;

Fig. 6 shows a sectional plan view, taken on line 6—6 of Fig. 1, of the means of adjustably supporting the cutting unit arbor;

Fig. 7 shows a detail vertical sectional view on line 7—7 of Fig. 1, better to illustrate the same cutter supporting means;

Fig. 8 shows a detail sectional plan view of the change gear drive located in the top of the machine frame, see Figs. 1, 2, and 3, through which different speeds for the worm block may be obtained; and Fig. 9 shows on a large scale side elevations of a cutter and a worm such as is produced by my machine and extensively used as one member of a worm and gear drive.

Figure 1:
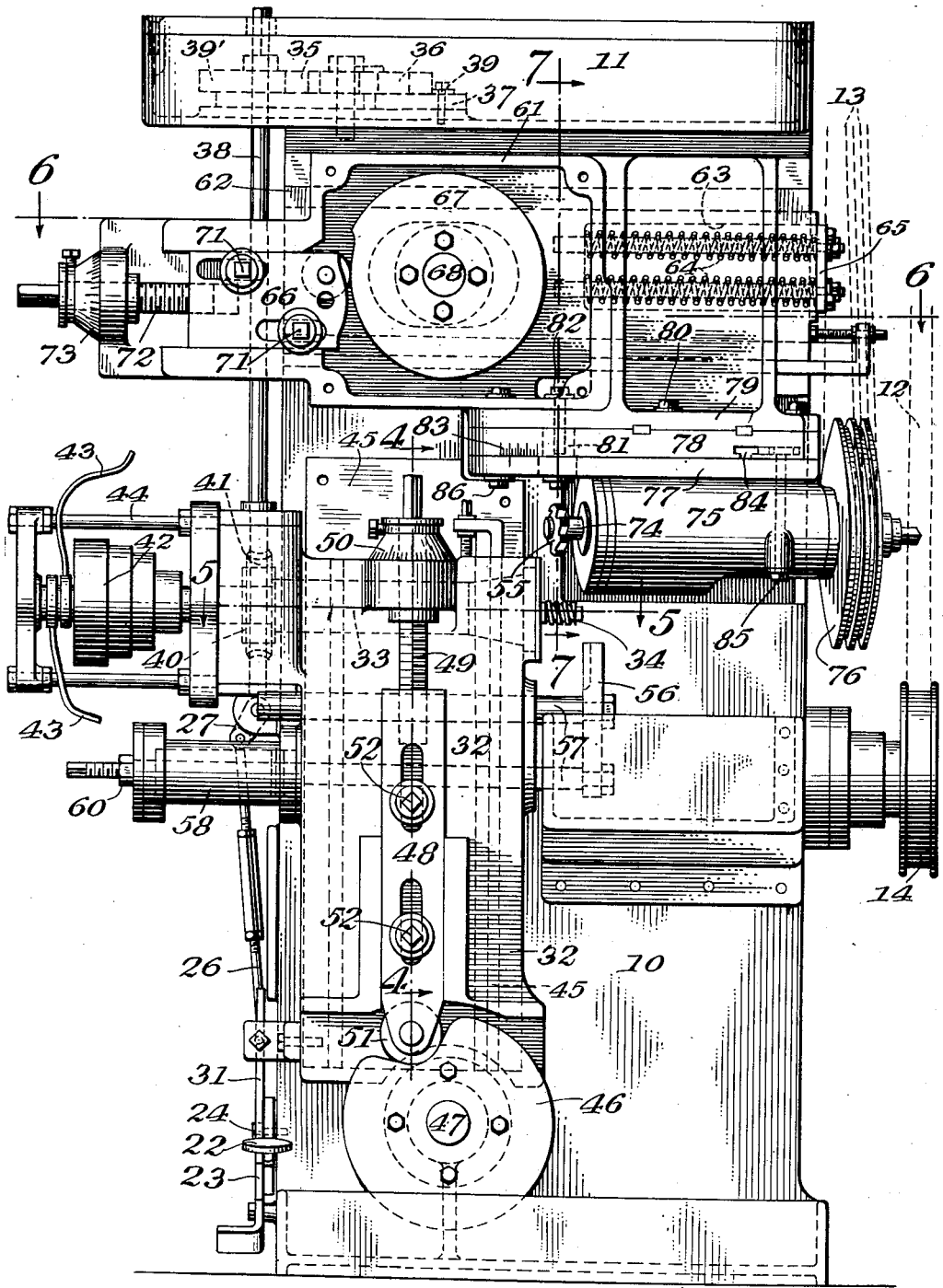

Referring in detail to the reference characters marked upon the drawings, 10 indicates the main frame of the machine which, as will be noted, is of a general upright form and has its top end portion enclosed by an additional frame member 11 that forms an enclosed gear compartment in which change speed gearing is housed, as will again be referred to. The frame 10 is preferably in the form of a single casting and for the most part is hollow, except for stiffening ribs and operative mechanism contained therein.

Figure 2:
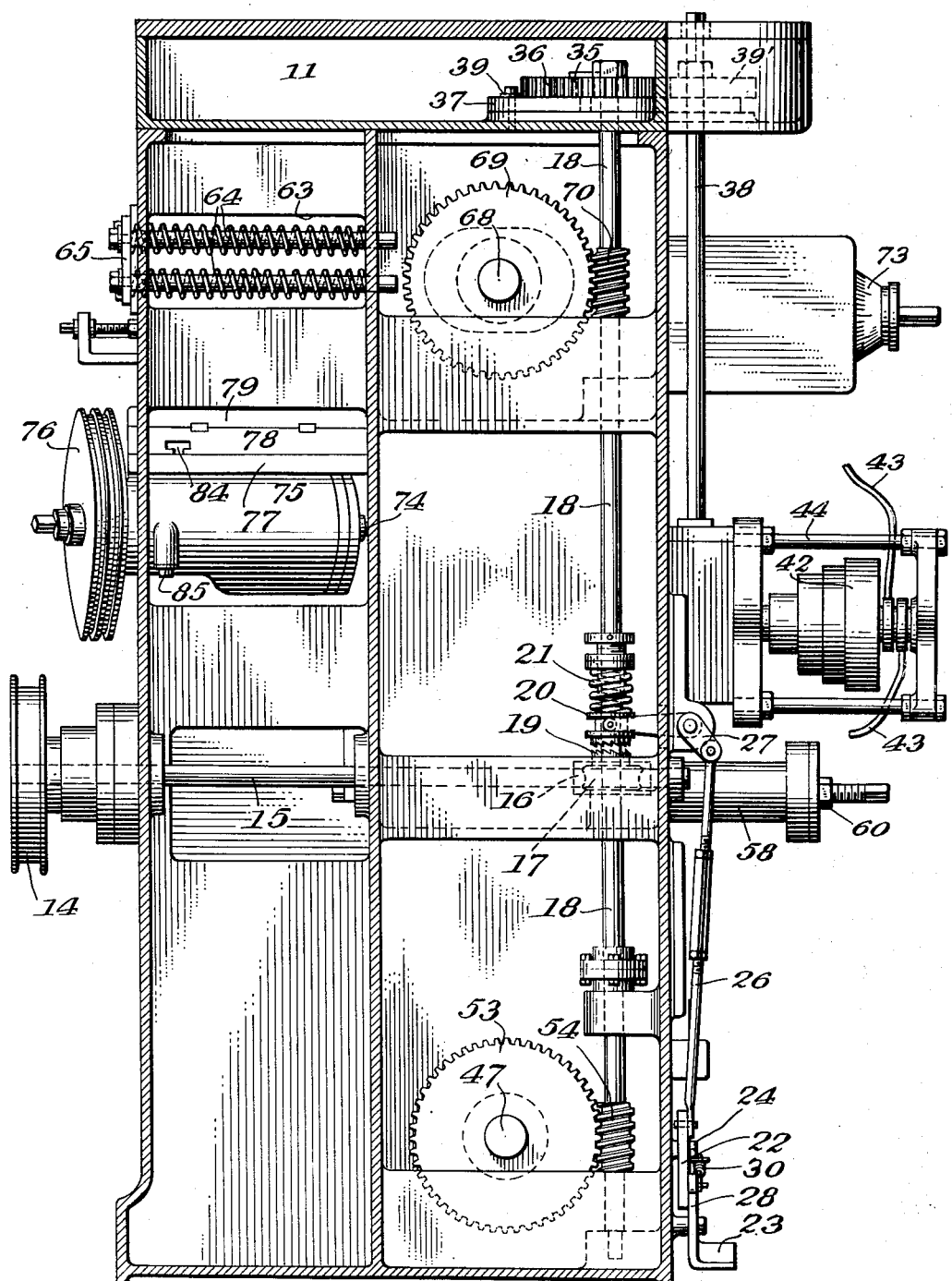
Fig. 2 is a rear sectional elevation taken on line 2—2 of Fig. 3, better to show the driving connections for the several productive operative parts shown on the front of the machine.

The power for the machine may be taken from a motor mounted upon the top of the machine or attached to it in some other suitable place and is transmitted through beltings 12 and 13, as indicated in dotted lines in Fig. 1. The first mentioned belt, see Figs. 1 and 2, is connected to drive a pulley 14 mounted upon a horizontal shaft 15 journaled in the frame 10 and carrying upon its opposite end portion a worm 16 that meshes with and drives a worm gear 17 loosely mounted upon a vertical shaft 18 that is also journaled in the frame 10.

This worm gear 17 is provided with a clutch face 19 for engagement with a clutch member 20 keyed to the said shaft 18 and provided with a spring 21 that normally tends to hold the clutch sleeve in engagement with the clutch face of the gear 17. This clutch drive connection obviously serves as the starting and stopping means of the machine and is controlled by levers 22 and 23, shown in Figs. 1, 2, and 3. The first mentioned lever, as will be seen from Fig. 3, is hingedly connected to the side of the frame at 24, and provided with a spring 25 for normally holding its treadle end up, and through the link connection 26 and the bell crank connections 27 to move the clutch sleeve out of engagement with the clutch faced gear, thus leaving the pulley 14, its shaft 15 and worm gear 17 free to run idle.

Means, as will be seen, is provided for holding these parts in this position and the clutches disengaged, which consist of a hook extension 28 formed on the lever 23 and designed to engage a pin 29 carried by the lever 22. A spring 30, one end of which is connected to the lever 22 and the other to the hook 28, is for the purpose of holding the said hook in engagement with the pin, thus holding the lever 22 and its connected parts in their set positions, which holds the clutch disengaged. An operation of this lever 23 naturally disengages the hook, allows the lever 22 to move up and the clutch to become disengaged.

Therefore, alternate operations of these foot levers 22 and 23 will serve to first disengage the clutch and second to engage it so that the machine can be readily stopped and started by an operator standing in front.

Provisions are included in my machine design for automatically stopping the feed movements of the two slides, as for instance when the operator desires to remove a finished piece and replace it with a blank to be cut. This automatic stoppage is accomplished by mounting a contacting rod 31 to the side of the vertically reciprocatory slide 32, shown in Fig. 3, and adjusting it with respect to the slide so that its lower end portion will contact the lever 23 and disengage its hook from the pin 29 of the lever 22 and thereby disengage the clutch 20, leaving the vertical shaft idle while the main driving shaft 15 continues to rotate. This slide 32 serves to carry the horizontal work spindle 33 in which the blank 34 is chucked, preparatory to being cut. A relatively slow rotary movement is imparted to this work spindle from the before mentioned vertical shaft 18 through the following change speed driving connections, see Figs. 2 and 8.

Upon the upper end of the shaft 18 is mounted a driving gear 35 which meshes with and drives an idler gear 36 carried by an adjustable plate 37 pivoted on the shaft 38 in the top frame member 11. A slot and screws 39 serve for the adjustment of the plate whereby different sized gears may be substituted and different speeds of the shaft 38 obtained. In this connection it will be noted that the idler gear meshes with gear 39' on shaft 38. Upon the lower end portion of this shaft is mounted a worm 40 that meshes with and drives a worm gear 41 upon the before mentioned work spindle.

42 represents air cylinders and 43 air pipes leading thereto, whereby the cylinders are operated. I have also shown a suitable support 44 carried by the slide 32 for these air cylinders, and air lines.

Referring to Figs. 3 and 4, it will be seen that the slide 32 is mounted upon a vertical dove-tail way 45, whereby it is free to be moved vertically by engagement with a cam 46 located beneath the lower end of the slide and mounted upon a short shaft 47. A suitable follower 48 is adjustably mounted in the face of the slide and includes a screw 49 carried in the slide and provided with a micrometer dial 50 which may be read in connection with a fixed part of the slide.

The threaded portion of the screw obviously engages and operates the follower member 48 in the adjusting operation for the setting of the roller 51 carried thereby, with respect to the axis of the shaft 47 upon which the cam 46 is mounted. Set screws 52 serve to secure the follower 48 and its roller 51 in position after the same have been set by the adjusting screw. The cam 46 is mounted upon a short shaft 47 that extends into the hollow of the frame and carries a gear 53 that meshes with and is driven by a worm 54 upon the before mentioned shaft 18. This line of mechanism, as thus far described, obviously serves to provide not only rotary movement to the work spindle, but vertical movement to the slide whereby it is brought up into position for engagement with the cutter 55 which is given a longitudinal movement as in the cutting of the grooves in the worm.

An adjustable stop guard 56 is also mounted in this slide for properly positioning certain kinds and larger pieces of work, not shown, in the chuck to be operated upon. This, as will be seen, comprises a pair of parallel longitudinal rods 57 that extend through the slide, the lower one passing through an air cylinder 58. A nut 60 mounted upon the threaded end of the lower rod serves as a means of adjustment of the stop member 56.

The second slide of my machine is positioned to reciprocate horizontally above the before mentioned slide 32 and like the lower slide is operated through a cam, driven from the before mentioned shaft 18. This top slide, which I will designate as 61, will be perhaps better understood from Figs. 6 and 7, and as will be seen is mounted on a suitable horizontal dove-tail way 62 that is formed integral with the main frame 10.

A pocket 63 is formed in the thicker portion of the frame forming the before mentioned way and is adapted to receive a pair of compression springs 64, one end of which abuts against an end wall of the pocket and the other against the plate 65 that encloses the said pocket, the object of course being to provide a tension to hold the roller of the adjustable follower 66 in engagement with the cam 67 and whereby the rotation of the cam will serve to move the slide horizontally with respect to the frame.

The cam 67 is mounted upon one end portion of a short shaft 68 which is journaled in the frame and has mounted upon its other end a worm gear 69 that meshes with and is driven by a worm 70 upon the before mentioned driven shaft 18. The follower 66 is mounted in suitable guide ways of the slide and provided with set screws 71, an adjusting screw 72 and a micrometer graduated surface 73 whereby the tool carried by the slide may be accurately positioned with respect to the work piece to be milled. This slide obviously carries the cutter 55, its arbor 74 and hanger 75.

Pulleys 76 mounted on the arbor 74 are driven through the before mentioned belts 13, thus affording an independent drive means from that of the rest of the machine. The upper portion of this hanger is flanged, as at 77, and is secured to a plate 78 which in turn is adjustable crosswise with respect to the under porton 79 of the slide. Screws 80 serve to secure the adjustable plate 78 and the portion 79 of the slide securely together, after the plate has been subject to delicate forward and backward movements so as to insure the proper positioning of the cutter arbor with respect to the work to be operated upon.

The hanger 75 is attached to the plate 78 in a manner to afford angular adjustment of the one with respect to the other, and better to provide necessary and variable leads in the feed of the cutting tool for producing different sizes and leads of worms. This angular adjustment is afforded by reason of the employment of a stud 81 which is mounted in the hanger though secured to the slide through a screw 82 in a manner to form a swivel upon which the hanger may be adjusted. In this connection it will be seen from Fig. 1 that a series of graduations 83 are marked upon the plate 78 in a way to be read by a line upon the face of the flange 77.

A T-slot 84, see Fig. 1 and dotted lines in Fig. 6, is formed in the underside of plate 78 to receive the T-bolt 85 whereby the outer end of the hanger which is subject to the greater movement may be supported and clamped in its adjustable position. Additional bolts 86, which are provided in the opposite end of the hanger for clamping that portion to the slide. These bolts 85 and 86 are obviously only loosened or tightened when it is necessary to change the angle of the arbor and cutter with respect to the work.

From the foregoing it will be seen that the work pieces may be readily placed in the chuck carried by the slide and secured in that position by air pressure, after which the machine will be started in a way to cause the roller to crawl up out of the pocket of the cam 46, thus raising the slide and bringing the work piece up against the underside of the cutter in position to be operated upon. The operation of the cutter, after the work piece has been positioned therein, is not only that of rotating, as a milling cutter, but is fed longitudinally of the worm in a manner to form a spiral female groove, producing a screw type of worm.

The machine is automatically stopped after the work has been finished by the engagement of the before mentioned rod with the foot treadle which throws out the drive for the two slides, leaving the machine idle for the moment while the operator removes the finished worm and replaces it with a new blank.

In view of the fore-going description of the construction and operation of the machine it will also be seen that if it is desired to use the same for cam milling it can readily be done by disengaging the upper slide from its cam 67 so that it will not be reciprocated thus leaving the cutter to be driven straight and not subjected to horizontal movement during the cutting operation. In this case the blank to be cut to form a cam would be suitably chucked in the spindle 33 so that the cutter carried by the arbor 74 would operate upon the periphery of the cam. A suitable master cam would be substituted for cam 46, and obviously serve to raise and lower the slide 32 and its spindle in a way to feed the blank to and from the cutter in corresponding relation to the contour of the master cam so as to reproduce cams having the same contour surface as that of the master cam.

Having thus described my invention, what I claim and desire to secure by Letters Patent is:

1. A thread milling machine comprising a stationary frame having vertical and transverse ways formed on the front side thereof, an elongated vertical drive shaft on the back side of the frame, a vertical reciprocatory slide mounted in the vertical ways, a horizontal reciprocatory slide mounted in the transverse ways above the vertical slide, spaced apart short shafts extending through the frame from front to back one in the lower portion of the frame and the other in the upper portion of the frame, gears connecting the drive shaft and the short shafts, a cam positioned on the front end portion of each of the short shafts, one for operating the horizontal slide and the other for operating the vertical slide, a horizontal work spindle carried in the vertical slide, separate means for driving the spindle, a hanger swively mounted upon the horizontal slide for angular adjustment, a cutter arbor journaled in the hanger and adapted to support a cutter above and in adjustable angular relation to the work spindle to cut threads of varying pitch in the work piece and means for adjusting the hanger and arbor.

2. A thread milling machine comprising a stationary frame having vertical and transverse ways formed on the front side thereof, an elongated vertical drive shaft on the back side of the frame, a vertical reciprocatory slide mounted in the vertical ways, a horizontal reciprocatory slide mounted in the transverse ways above the vertical slide, spaced apart short shafts extending through the frame from front to back one in the lower portion of the frame and the other in the upper portion of the frame, gears connecting the drive shaft and the short shafts, a cam positioned on the front end portion of each of the short shafts, one for operating the horizontal slide and the other for operating the vertical slide, means for driving the work spindle including a gear upon the spindle, a drive shaft, a worm slidably mounted upon the shaft and meshing with a gear to operate the same and spindle, a hanger swively mounted upon the horizontal slide for angular adjustment, a cutter arbor journaled in the hanger and adapted to support a cutter above and in adjustable angular relation to cut threads of a varying pitch in the work piece, means for adjusting the hanger and separate means for driving the cutter arbor.

3. A thread milling machine comprising a stationary frame having vertical and transverse ways formed one above the other in the face thereof, a work carrying slide mounted in the vertical ways, a reciprocatory cutter slide mounted in the transverse ways, a work spindle carried in the first mentioned slide, means for driving the spindle, cam means for supporting and raising and lowering the work slide for cutting operations, a single driving shaft for operating the separate cam means for the two said slides, a short shaft journalled in the frame, a cam upon the short shaft for operating the cutter slide, a spring intermediate the frame and horizontal slide to retain the slide in engagement with the said cam, an adjustable follower mounted in the cutter slide and carrying a roller to engage the cam for operating the cutter slide, means for operating the short shaft, a hanger swively mounted upon the horizontal slide for angular adjustment, a cutter arbor journaled in the hanger and adapted to support a cutter above and in adjustable angular relation to the work spindle to cut threads of varying pitch in the work piece, means for adjusting the hanger, and means for driving the cutter arbor.

NEWMAN M. MARSILIUS.